US010357930B2

(12) United States Patent
Ishihara

(10) Patent No.: US 10,357,930 B2
(45) Date of Patent: Jul. 23, 2019

(54) TIRE VULCANIZATION MOLD AND METHOD OF MANUFACTURING THEREOF

(71) Applicant: BRIDGESTONE CORPORATION, Tokyo (JP)

(72) Inventor: Yasuyuki Ishihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/775,205

(22) PCT Filed: Sep. 6, 2016

(86) PCT No.: PCT/JP2016/076191
§ 371 (c)(1),
(2) Date: May 10, 2018

(87) PCT Pub. No.: WO2017/085987
PCT Pub. Date: May 26, 2017

(65) Prior Publication Data
US 2018/0319111 A1      Nov. 8, 2018

(30) Foreign Application Priority Data

Nov. 19, 2015   (JP) ................................. 2015-226771

(51) Int. Cl.
*B29D 30/06*      (2006.01)
*B29C 33/02*      (2006.01)
(Continued)

(52) U.S. Cl.
CPC .......... *B29D 30/0606* (2013.01); *B29C 33/02* (2013.01); *B29C 33/38* (2013.01);
(Continued)

(58) Field of Classification Search
CPC ........ B29D 30/0606; B29D 2030/0613; B29D 2030/0617; B29C 33/3842
See application file for complete search history.

(56) References Cited

U.S. PATENT DOCUMENTS 9,102,112 B2 *   8/2015   Takada ................... B29C 33/10
2002/0139164 A1 * 10/2002  Ishihara ................. B21D 37/20
                                                            72/326
(Continued)

FOREIGN PATENT DOCUMENTS

JP        2-303809      * 12/1990
JP        H03-1910 A      1/1991
(Continued)

OTHER PUBLICATIONS

Nov. 22, 2016 International Search Report issued in International Patent Application No. PCT/JP2016/076191.
(Continued)

*Primary Examiner* — James P Mackey
(74) *Attorney, Agent, or Firm* — Oliff PLC

(57) ABSTRACT

A tire vulcanization mold has a mold main body, and blades having, at proximal end sides thereof, embedded portions that are fixed to the mold main body in embedded states, and, at distal end sides thereof, projecting portions that project-out from the mold main body's inner surface, wherein at least one introducing path extends from a projecting portion side surface toward a blade inner portion is formed at each blade, and, a connecting path, shaped as a closed space and connects the introducing path and a proximal end opening, is formed at each blade's interior, a discharge path, whose one end opening communicates with proximal end opening and whose other end opening communicates with external space, is formed in the mold main body, and, a maximum flow path sectional area at the connecting path less than or equal to an opening surface area of discharge path's one end opening.

20 Claims, 10 Drawing Sheets

(51) Int. Cl.
  *B29C 33/38*  (2006.01)
  *B29C 35/02*  (2006.01)
(52) U.S. Cl.
  CPC .......... *B29C 33/3842* (2013.01); *B29C 35/02* (2013.01); *B29D 2030/0613* (2013.01); *B29D 2030/0617* (2013.01)

(56) References Cited

U.S. PATENT DOCUMENTS

2010/0300626 A1\* 12/2010 Nguyen ................. B60C 11/12
                                                157/13
2014/0370137 A1    12/2014 Takada

FOREIGN PATENT DOCUMENTS

| JP | 4-353432      | \* 12/1992 |
| JP | 8-323771      | \* 12/1996 |
| JP | 2001-170939 A |   6/2001   |
| JP | 2013-075593 A |   4/2013   |
| JP | 2013-158989 A |   8/2013   |
| JP | 2014-151518 A |   8/2014   |

OTHER PUBLICATIONS

Sep. 28, 2018 Extended Search Report issued in European Patent Application No. 16865990.2.

\* cited by examiner

US 10,357,930 B2

TIRE VULCANIZATION MOLD AND METHOD OF MANUFACTURING THEREOF

TECHNICAL FIELD

The present disclosure relates to a tire vulcanization mold that has a mold main body and sipe blades that proximal end sides thereof are fixed to the mold main body in embedded states, and to a method of manufacturing the tire vulcanization mold.

BACKGROUND ART

The structure disclosed in Japanese Patent Application Laid-Open (JP-A) No. 2014-151518 for example is known as a conventional tire vulcanization mold.

This structure is a structure having a mold main body, and sipe blades that are blade-shaped, and that have, at proximal end sides thereof, embedded portions that are fixed to the mold main body in embedded states, and that have, at distal end sides thereof, projecting portions that project-out from the inner surface of the mold main body. This sipe blade is structured from two thin-walled plates that overlap one another in parallel, and a spacer that forms a plate-shaped exhaust space at the interior of the sipe blade by being interposed between the distal end edges and between the transverse direction both end edges of these plates and by joining the distal end edges of these two plates together and the transverse direction both end edges together. Coaxial holes that communicate with the exhaust space are formed in the two plates respectively at the projecting portions. Moreover, a discharge path, whose one end opening communicates with the proximal end opening of the exhaust space and whose other end opening communicates with an external space, is formed in the mold main body.

SUMMARY OF INVENTION

Technical Problem

However, in such a conventional tire vulcanization mold, a large-volume cavity (exhaust space), which is plate-shaped and which fills with air whose thermal conductivity is low, is formed at the interior of the sipe blade. Therefore, a difference arises in the thermally conductive states with respect to the unvulcanized rubber at the both sides of the sipe blade at the time of vulcanization, and, as a result, there is the problem that the rates of progression of the vulcanization differ at the both sides of the sipe blade. Moreover, if a large-volume cavity (an exhaust space) such as described above is formed within the sipe blade, the strength of the sipe blade decreases. Therefore, when the transverse direction both end portions of the sipe blade are in free states and not embedded in a rib that is formed at the mold main body (i.e., when the sipe groove ends midway through the land portion), there is also the problem that, due to the bending force that is applied to the sipe blade at the time of opening the tire vulcanization mold, the sipe blade will bend and break at the border between the embedded portion and the projecting portion thereof.

An object of the present disclosure is to provide a tire vulcanization mold that can effectively uniformize the rates of progression of vulcanization at both sides of a sipe blade and can improve the strength of the sipe blade and effectively suppress breakage thereof, and a method of manufacturing the tire vulcanization mold.

Solution to Problem

Such an object can be achieved by a tire vulcanization mold having a mold main body, and blades having, at proximal end sides thereof, embedded portions that are fixed to the mold main body in embedded states, and, at distal end sides thereof, projecting portions that project-out from an inner surface of the mold main body, wherein at least one introducing path that extends from a projecting portion side surface toward a blade inner portion is formed at each blade, a connecting path, which is shaped as a closed space and which connects the introducing path and a proximal end opening that opens at a proximal end of the blade, is formed at an interior of each blade, a discharge path, whose one end opening communicates with the proximal end opening and whose other end opening communicates with an external space, is formed in the mold main body, and, a maximum flow path sectional area at the connecting path is less than or equal to an opening surface area of the one end opening of the discharge path.

Advantageous Effects of Invention

In the present disclosure, the maximum flow path sectional area of the connecting path, which connects the introducing path formed in the projecting portion side surface of the blade and the proximal end opening of the blade, is made to be less than or equal to an opening surface area of one end opening of the discharge path which is formed in the mold main body and whose one end opening communicates with the proximal end opening of the connecting path. Therefore, the volume of the connecting path (cavity) at the interior of the blade is a small value. As a result, the thermally conductive states with respect to unvulcanized rubber at the both sides of the blade at the time of vulcanization approximate one another, and the rates of progression of vulcanization at the both sides of the blade can effectively be made to be uniform. Moreover, because the volume of the connecting path (cavity) that is formed within the blade is a small value, the strength of the blade improves on the whole. As a result, even if bending force is applied to the blade at the time of opening the tire vulcanization mold, a situation in which there is breakage at the border between the embedded portion and the projecting portion is suppressed effectively.

DESCRIPTION OF EMBODIMENTS

Figure 1:
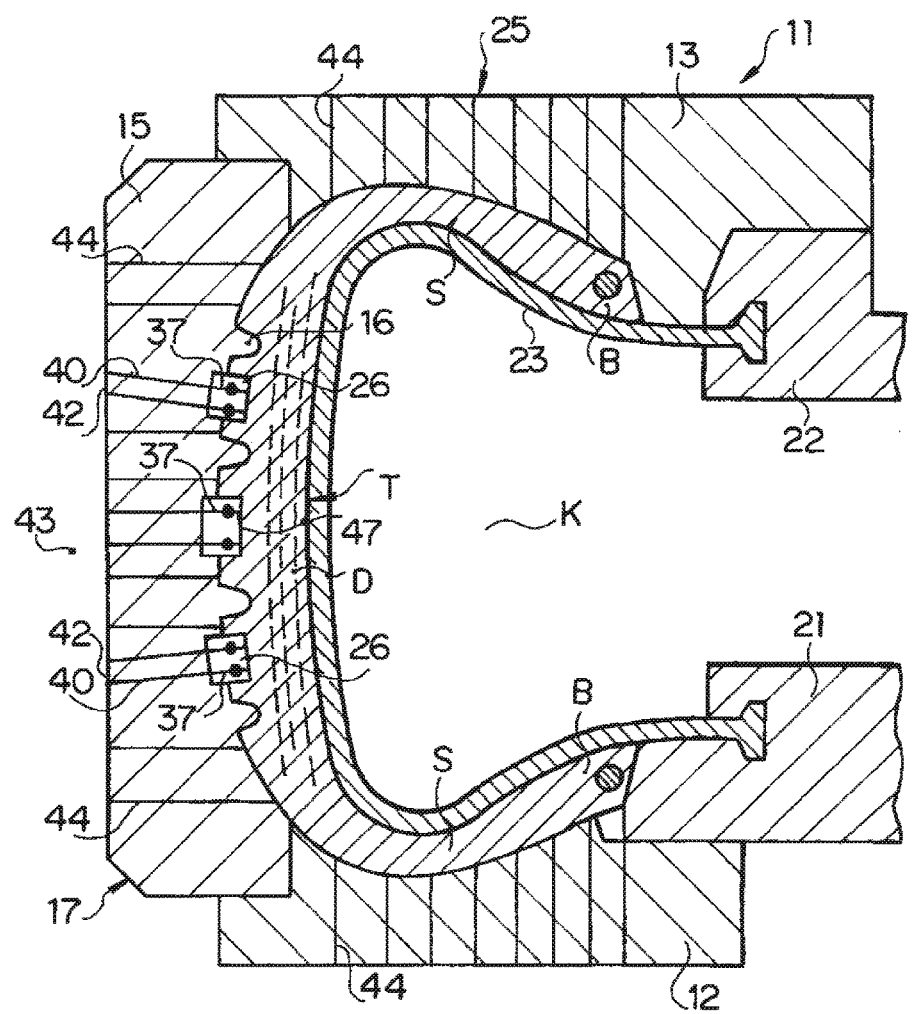
FIG. 1 is a front sectional view showing Embodiment 1 of this invention.
Figure 2:
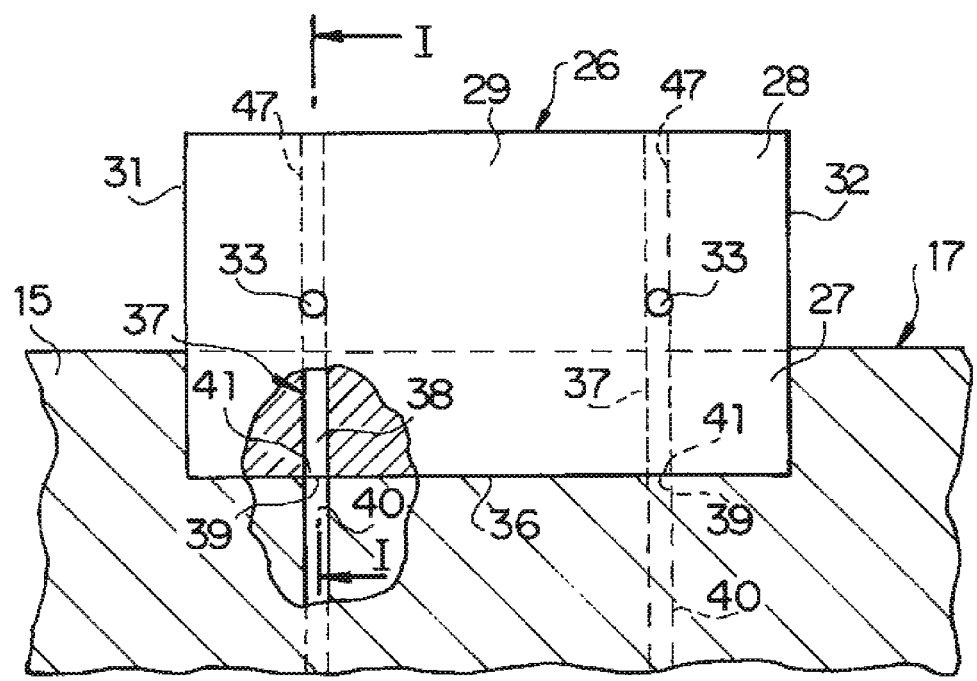
FIG. 2 is a front sectional view of a vicinity of a blade.
Figure 3:
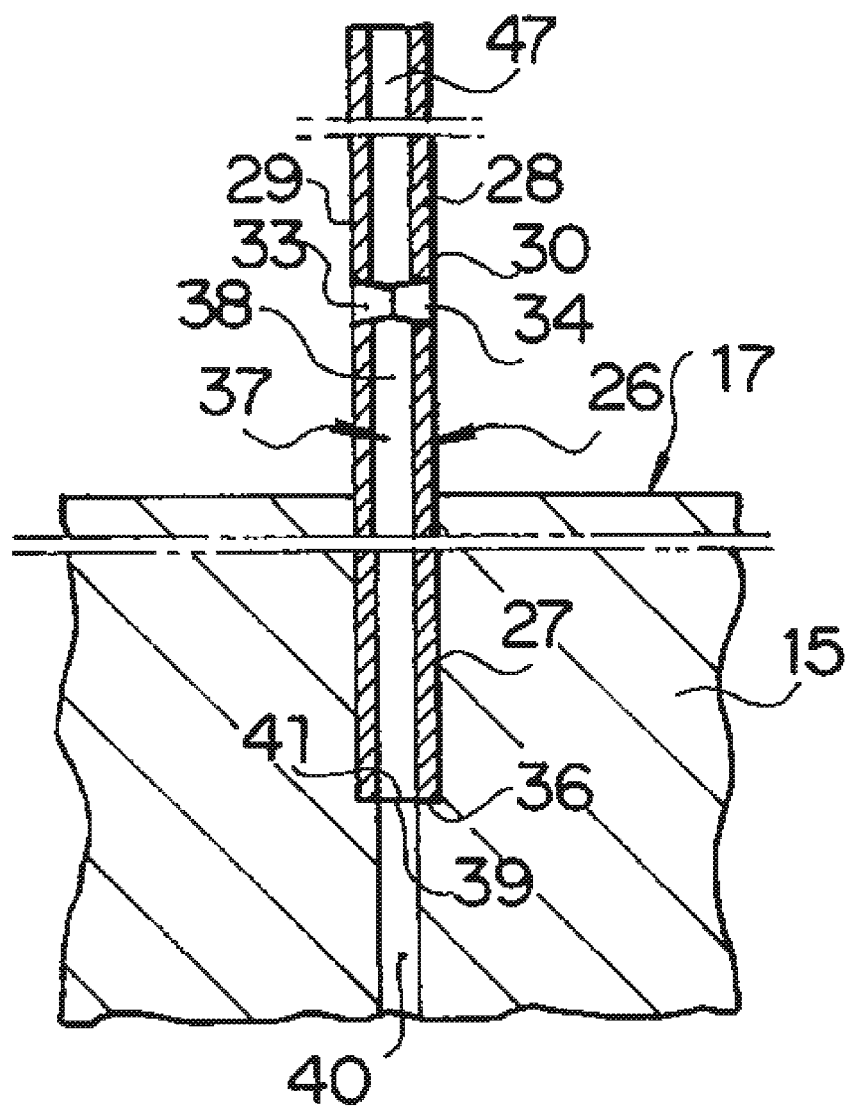
FIG. 3 is a cross-sectional view seen in the direction of arrow line I-I of FIG. 2.
Figure 4:
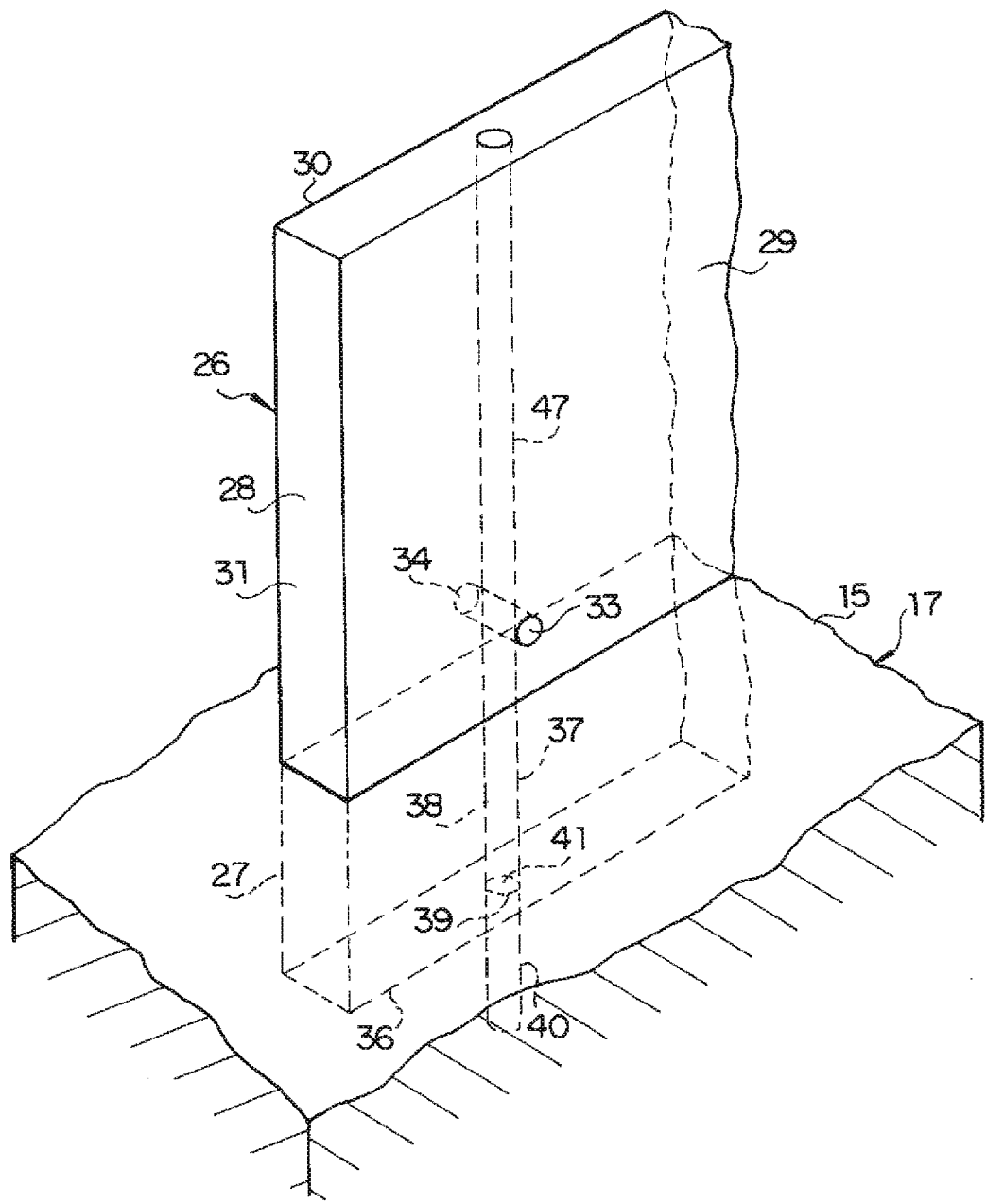
FIG. 4 is a perspective view of a vicinity of the blade.

Embodiment 1 of this invention is described hereinafter on the basis of the drawings. In FIGS. 1-4, 11 is a tire vulcanizing device. This tire vulcanizing device 11 has a lower mold 12 that is fixed to a lower base that is not illustrated. At the time of vulcanization, a lower side sidewall portion S of an unvulcanized tire T is patterned mainly by the lower mold 12. 13 is an upper mold that is set above the lower mold 12. This upper mold 13 is fixed to an unillustrated upper plate that can be raised and lowered. As a result, when the upper plate is raised and lowered, the upper mold 13 also rises and falls together with the upper plate, and approaches and moves away from the lower mold 12. Note that, in this embodiment, the upper mold 13 is fixed, and, on the other hand, the lower mold 12 can be raised and lowered, or the lower mold 12 and the upper mold 13 can both be raised and lowered. In other words, it suffices for the lower mold 12 and the upper mold 13 to be able to be approach and move away from one another. Further, when the upper mold 13 is lowered as described above, the upper mold 13 approaches the lower mold 12 and contacts the unvulcanized tire T that is placed laterally on the lower mold 12. As a result, at the time of vulcanization, the upper mold 13 can pattern mainly the upper side sidewall portion S of the unvulcanized tire T, and here, can also pattern an upper side bead portion B together therewith.

15 are plural (e.g., 9) sector molds that are formed in arc shapes and are disposed so as to be lined-up in the peripheral direction. At the time of vulcanization, these sector molds 15 mainly pattern a tread portion D of the unvulcanized tire T, and can be moved synchronously in the radial direction by an unillustrated synchronous moving mechanism. Further, ribs 16, which project-out substantially toward the radial direction inner side and that, by being pushed-into the tread portion D of the unvulcanized tire T, form wide-width grooves such as main grooves, lateral grooves and the like in the outer surface of the tread portion D, are provided at the inner surfaces (the radial direction inner side surfaces, the patterning surfaces) of the sector molds 15. Further, when all of the sector molds 15 are moved to their radial direction inner side limits by the synchronous moving mechanism, the peripheral direction side surfaces of these sector molds 15 fit tightly to one another and become a continuous ring-shape. At this time, the sector molds 15 fit tightly to the upper mold 13 and the lower mold 12 that have been set close to one another. Due thereto, these sector molds 15, together with the lower mold 12 and the upper mold 13, form a donut-shaped, sealed accommodating space K that accommodates the unvulcanized tire T at the interior thereof. The above-described plural sector molds 15, on the whole, structure a mold main body 17 that mainly patterns the tread portion D of the unvulcanized tire T. Further, the above-described lower mold 12, upper mold 13 and mold main body 17 are generally structured from an aluminum alloy.

21 is a lower clamp ring that can be raised and lowered. This lower clamp ring 21 can pattern the lower side bead portion B of the unvulcanized tire T at the time of vulcanization, and, when lowered, can abut the top surface of the inner end portion of the lower mold 12. 22 is an upper clamp ring that is set above the lower clamp ring 21 and can be raised and lowered independently of the lower clamp ring 21. When raised, this upper clamp ring 22 can abut the bottom surface of the inner end portion of the upper mold 13. 23 is a vulcanization bladder that is inflatable and contractible and whose lower end portion is held in an airtight state at the lower clamp ring 21 and whose upper end portion is held in an airtight state at the upper claiming 22, respectively. When a high-temperature, high-pressure vulcanization medium is supplied to the interior thereof, this vulcanization bladder 23 inflates in the shape of a donut within the unvulcanized tire T, and the unvulcanized tire T is vulcanized while being pushed-against and patterned by the lower mold 12, the upper mold 13, the mold main body 17 and the lower clamp ring 21.

Sipe blades 26, which serve as plural blades and which are formed in the shapes of thin-walled plates, are provided at the mold main body 17. These sipe blades 26 usually are structured from stainless steel or carbon steel. Further, these sipe blades 26 extend rectilinearly or while bending, in a state of being inclined with respect to the peripheral direction. There are the sipe blades 26 whose transverse direction both ends both are apart from the above-described ribs 16, and there are the sipe blades 26 whose at least transverse direction one ends are embedded in the ribs 16. Further, the sipe blade 26 has an embedded portion 27 at the proximal end side (the radial direction outer side) thereof, and has a projecting portion 28 at the distal end side (the radial direction inner side) thereof. The embedded portion 27 is fixed to the mold main body 17 in an embedded state. The projecting portion 28 projects-out toward the radial direction inner side from the inner surface (the patterning surface) of the mold main body 17. Here, the above-described lower mold 12, upper mold 13, mold main body 17 and sipe blades 26 on the whole structure a tire vulcanization mold 25 that vulcanizes the unvulcanized tire T. Note that, in this embodiment, the tire vulcanization mold may be structured from the lower mold and the sipe blades, that are able to approach and move away from one another. When the vulcanization mold 25 is closed, the projecting portions 28 of the sipe blades 26 that project-out from the inner surface of the mold main body 17 are pushed-into the tread portion D of the unvulcanized tire T, and form, in the outer surfaces of the land portions (the ribs, blocks and the like) of the tread portion D, sipe grooves whose widths are narrow to the extent that the sipe grooves close when contacting the ground, and are usually widths of 0.5~3.0 mm.

The sipe blade 26 that has the above-described plate shape has four side surfaces. Among these side surfaces, the two side surfaces that are parallel to one another and whose surface areas are large are a first side surface 29 and a second side surface 30. Further, the two side surfaces, which are parallel to one another and which connect the side ends of the first side surface 29 and the second side surface 30 to one another and whose surface areas are smaller than those of the first side surface 29 and the second side surface 30, are a first side end surface 31 and a second side end surface 32. Further, at least one, and here, two introducing paths 33, 34 are formed in at least either one of, and, here, in both of, the first side surface 29 and the second side surface 30 that are positioned at the projecting portion 28. The introducing paths 33, 34 extend toward the interior (here, the thickness direction center) of the sipe blade 26 while respectively being inclined with respect to the first side surface 29 and the second side surface 30, and here, while intersecting the first side surface 29 and the second side surface 30 at right angles. Here, the introducing paths 33, 34, which are formed as pairs and are formed at both side surfaces of the projecting portion 28, and here, at both of the first side surface 29 and the second side surface 30, are positioned on the same straight lines. Further, these introducing paths 33, 34 that are formed as pairs communicate with one another at the deepest portions thereof.

As a result, so-called cross-vents that communicate the spaces at the both sides of the sipe blade 26 are structured by the pairs of introducing paths 33, 34 that are positioned on the same straight lines as described above. Due thereto, air that remains at one side of the sipe blade 26 can be led to the remaining one side. Further, because these cross-vents are used directly in the discharging of air as will be described later, the structure for discharging air can be made to be simple. Further, in order to reliably carry out discharging of remaining air, the introducing paths 33, 34 may be formed at the proximal end portion of the projecting portion 28 that is adjacent to the inner surface of the mold main body 17. Moreover, it is preferable that, the deeper the depths of the introducing paths 33, 34 which are formed as pairs and structure the cross-vents as described above (the closer the introducing paths 33, 34 are to the thickness direction center of the sipe blade 26), the smaller the flow path sectional areas of the introducing paths 33, 34 (the more the introducing paths 33, 34 taper off). The reason for this is that, if there is a structure as described above, even if unvulcanized rubber flows into the introducing paths 33, 34 at the time of vulcanizing the unvulcanized tire T, the vulcanized rubber that becomes the most narrow at the deepest portions of (the border between) the introducing paths 33, 34 at the time of opening the vulcanization mold 25 is divided, and therefore, the vulcanized rubber can be can be easily pulled-out from the introducing paths 33, 34, and a situation in which vulcanized rubber remains in these introducing paths 33, 34 can be suppressed easily.

37 are plural connecting paths that are formed at the interior of the sipe blade 26, and here, are the same number as the total number (four) of the introducing paths 33, 34, and the flow path sectional areas of the connecting paths 37 are constant at all of the positions thereof. One ends of these connecting paths 37 communicate with the introducing paths 33, and the other ends thereof communicate with two proximal end openings 39 that open at a proximal end 36 of the sipe blade 26. Here, because there are a total of four of the introducing paths 33, 34, four of the connecting paths 37 also exist. In this embodiment, because the introducing paths 33, 34 that are formed as pairs communicate with one another at the deepest portions thereof as described above, the connecting path 37 is used in common at the introducing paths 33, 34 that are formed as a pair. As a result, the actual number of the connecting paths 37 is 2, and the number of proximal end openings 39 is 2, respectively. Note that, in this embodiment, it suffices for one or more introducing path to be formed at at least any one of the first side surface 29, the second side surface 30, the first side end surface 31, and the second side end surface 32. Further, one end of the introducing path may open at the first side surface 29, the second side surface 30, the first side end surface 31 or the second side end surface 32, and the remaining other end may end at the thickness direction central portion of the sipe blade 26, and one end of the connecting path may be connected to this remaining one end of the introducing path. In this case, the connecting path is not used in common, and the number of introducing paths and the numbers of connecting paths and proximal end openings are the same.

Further, the connecting path 37 has the form of a closed space. Here, the form of a closed space does not mean the form of an open space that there is a hole of the introducing path that is like a window in the side surface of one space, and there is a hole of the discharge path in the floor, and that is such that air enters into and exits from the space. The form of a closed space means a state that is as if the hole of the introducing path and the hole of the discharge path are connected by a pipe, and, in other words, the path is connected continuously from one end to the other end, but, midway therealong, the space is not exposed at (an opening is not formed at) the side surface of the sipe blade 26, and, as a result, only the both ends of this connecting path 37 are open, and the midway section of the connecting path 37 is sealed. If the connecting path 37 has the form of a closed space in this way, at the time when the embedded portion 27 of the sipe blade 26 is embedded in the mold main body 17 by insert casting, a situation in which molten metal flows into the connecting path 37 can be prevented reliably. Further, the connecting path 37 is structured from at least an extending portion that extends substantially in the radial direction along the side surface of the sipe blade 26, and, in this embodiment, is structured from only an extending portion 38. Here, in this embodiment, this extending portion 38 extends rectilinearly along a line that is normal with respect to the inner surface of the mold main body 17 (the sector mold 15), but may extend rectilinearly along a radial direction line that is orthogonal to the central axis of the vulcanization mold 25, or may be slightly curved. Note that, as will be described later, these connecting paths may be structured from an extending portion, which communicates with the proximal end opening, and a connecting portion that intersects the extending portion and connects the extending portion and the introducing path.

40 is a discharge path that is formed in the mold main body 17 (the sector mold 15), and whose cross-sectional shape is the same as or a shape similar to that of the proximal end opening 39, and a number of discharge paths 40 that is the same as the number of proximal end openings 39 are provided. One end openings 41 of these discharge paths 40 open at the bottom wall of the groove in which the embedded portion 27 of the sipe blade 26 is embedded, and communicate with the extending portions 38 (the proximal end openings 39) of the connecting paths 37. On the other hand, other end openings 42 of the discharge paths 40 communicate with an external space 43 that is positioned at the outer side of the vulcanization mold 25. As a result, air, which remains between the unvulcanized tire T and the vulcanization mold 25 at the time of vulcanizing the unvulcanized tire T, is discharged-out to the external space 43 through the introducing paths 33, 34, the connecting paths 37 and the discharge paths 40. Due thereto, a situation in which entry of air into the vulcanized tire occurs, or recesses or the like arise in the surface thereof, can be suppressed effectively. Here, the other end openings 42 of the discharge paths 40 may open at the outer surface of the mold main body 17 (the radial direction outer side surfaces of the sector molds 15) as in this embodiment. Or, the other end openings 42 may be made to communicate with the external space 43 by making the other end openings 42 open at side surfaces such as the abutment surfaces at which the adjacent sector molds 15 can abut one another, or the like. Note that 44 are plural vent holes that are formed in the lower mold 12, the upper mold 13 and the sector molds 15 that structure the vulcanization mold 25, and connect the inner surfaces and the outer surfaces of these, and have small diameters (diameters of around 0.6~1.6 mm). Remaining air such as described above is discharged to the external space 43 through these vent holes 44 as well.

Further, the maximum flow path sectional area at the connecting path 37 is less than or equal to the opening surface area of the one end opening 41 of the discharge path 40 that is connected to the connecting path 37, i.e., is the same as the opening surface area of the one end opening 41 or is less than the opening surface area. Here, the maximum flow path sectional area at the connecting path 37 means the maximum value among the flow path sectional areas at the respective positions of the connecting path 37 (the sectional areas of the connecting path 37 cut along planes orthogonal to the direction of the flow). The maximum flow path sectional area of the connecting path 37, which connects the proximal end opening 39 of the sipe blade 26 and the introducing path 33, 34 formed at the side surface of the projecting portion 28 of the sipe blade 26, is, in this way, made to be less than or equal to the opening surface area at the one end opening 41 of the discharge path 40 that is formed in the mold main body 17 and communicates with the proximal end opening 39. Therefore, the flow path sectional area at every position of the connecting path 37 also is less than or equal to the opening surface area of the one end opening 41 at the discharge path 40. Due thereto, the volume of the connecting path 37 (the cavity that is filled with air whose thermal conductivity is low) within the sipe blade 26 is a small value. As a result, the thermally conductive states with respect to the unvulcanized rubber at the both sides of the sipe blade 26 at the time of vulcanization approximate one another, and the rates of progression of vulcanization at the both sides of the sipe blade 26 can effectively be made to be uniform. Moreover, because the volume of the connecting path 37 (the cavity) that is formed within the sipe blade 26 is a small value, the strength of the sipe blade 26 improves overall. As a result, even if bending force is applied to the sipe blade 26 at the time of opening the vulcanization mold 25, the bending strain at the border of the embedded portion 27 and the projecting portion 28 is small, and a situation such as the sipe blade 26 breaking at that region is suppressed effectively.

Here, in a case in which the shapes of the openings of the introducing paths 33, 34 are circular, the diameter is usually within the range of 0.6~1.6 mm, but the shapes of the openings may be flattened and made into the shapes of slits that are rectangular, elliptical or the like, while the opening surface areas of these introducing paths 33, 34 are substantially maintained. At this time, if the width of the opening is set within the range of greater than or equal to 0.09 mm and less than 0.5 mm, the height of the spew (a whisker-like projection formed from rubber) that is formed due to the unvulcanized rubber penetrating into the introducing path can be made to be lower than in the above-described case of a circular shape. Further, if the width of the opening is set within a range of greater than or equal to 0.06 mm and less than 0.09 mm, the spew can be made to be in a disconnected state in which the spew is not connected continuously in the length direction, while the height of the spew is reduced even more. Moreover, if the width of the opening is greater than 0 mm and less than 0.06 mm, the generation itself of the aforementioned spew can be suppressed effectively.

Note that the aforementioned width of the opening means the short-side direction length of the opening. Further, as the opening of the introducing path, one slit may be formed as if plural holes were lined-up discontinuously in the form of a dotted line. Further, when the shape of the opening of the introducing path is a flat shape such as mentioned above, it is preferable that the cross-sectional shapes of the connecting paths 37 and the discharge paths 40 are the same shapes as that of the introducing paths. Further, it is preferable that the diameter or the width of the one end opening 41 of the discharge path 40 is less than or equal to the distance (the pitch) between the adjacent sipe blades 26 that are provided so as to be lined-up. The reasons for this is that, if the diameter or the width of the one end opening 41 exceeds the distance between the sipe blades 26, there is the concern that the one end openings 41 that are adjacent to one another will connect and the strength of the sector mold 15 will decrease. Moreover, the cross-sectional shapes of the introducing paths, the connecting paths and the discharge paths may be polygonal such as square, hexagonal, or the like.

47 is at least one distal end path that is formed within the sipe blade 26 (the projecting portion 28), further toward the distal end side than the introducing paths 33, 34. These distal end paths 47 extend rectilinearly, or while curving, from the distal ends of the extending portions 38 to the distal end surface of the sipe blade 26, on extension lines of the extending portions 38 of the connecting paths 37. If the distal end paths 47, which extend from the distal ends of the extending portions 38 to the distal end surface of the sipe blade 26 on extension lines of the extending portions 38 in this way, are formed within the sipe blades 26, when clogging arises due to rubber, dirt or the like within the connecting paths 37 (the extending portions 38) due to repeated vulcanizations, the clog can be eliminated by inserting a rotating tool or an ultrasonic vibrating tool for cleaning in from the distal end of the distal end path 47, or the clog can be eliminated by injecting a chemical cleaning agent or grinding grit, or the like. Note that the aforementioned cleaning can also be carried out from the radial direction outer end side (the external space 43 side) of the discharge path 40. If cleaning is carried out from the distal end side of the distal end path 47 as described above, the distance from the exterior to the clog is short, and the clog can be eliminated easily and reliably. Here, in order to facilitate the cleaning work, it is preferable that the cross-sectional shape of the distal end path 47 be the same shape as the cross-sectional shape of the connecting path 37 (the extending portion 38).

Figure 5:
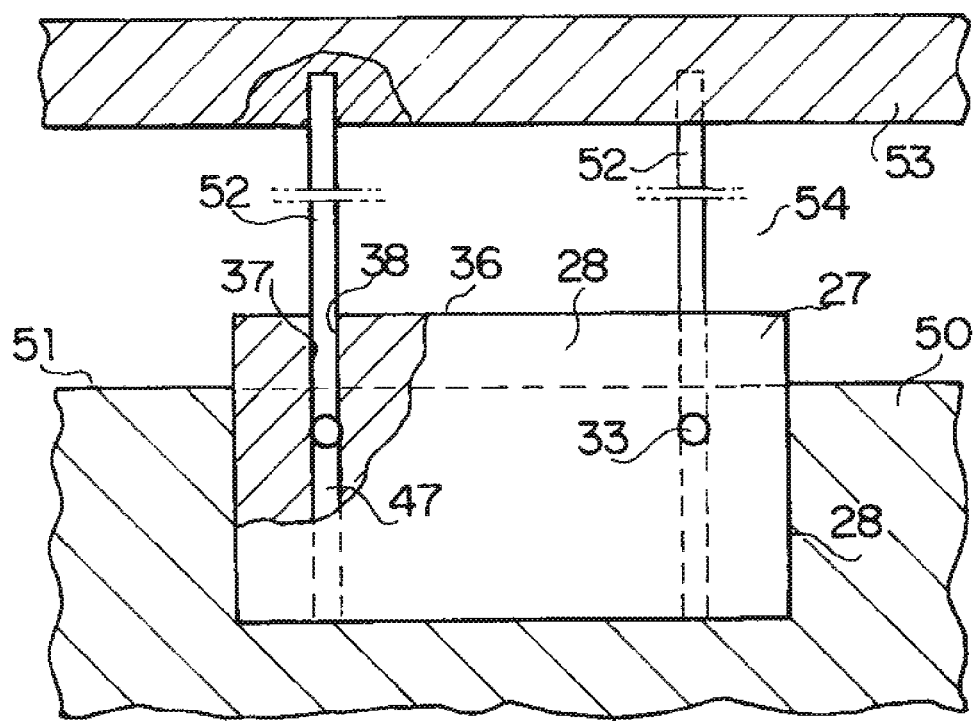
FIG. 5 is a front sectional view for explaining a manufacturing process of a vulcanization mold.

If the sipe blades 26, at whose interiors the above-described connecting paths 37 and distal end paths 47 are formed, are manufactured in advance before the work of fixing the embedded portions 27 of the sipe blades 26 into the mold main body 17 as will be described later, this manufacturing can be carried out simply and rapidly. Further, the sipe blades 26 such as described above can be manufactured relatively easily by using, for example, a precision casting method, an electroforming method (a method of manufacturing a metal product by electroplating), or a laminated molding method (a powder-sintering-type laminating method using a laser beam), or a diffusion bonding method (a method of tightly fitting a base metal, and, under the condition of a temperature that is less than or equal to the melting point of the base metal, applying pressure to the extent that plastic deformation arises as little as possible, and joining by using the diffusion of atoms that arises between the surfaces to be joined together. Next, in manufacturing the mold main body 17 at which such sipe blades 26 are provided, first, the projecting portions 28 of the sipe blades 26 are, as shown in FIG. 5 for example, are embedded in a collapsible casting mold 50 that is formed of gypsum or the like, and, due thereto, the embedded portions 27 of the sipe blades 26 are made to project-out from a patterning surface 51 of this casting mold 50. Thereafter, molding pins 52, which extend along the connecting paths 37 (the extending portions 38) and the distal end paths 47 that have been molded and are the same diameters as these connecting paths 37 (the extending portions 38) and the distal end paths 47, are inserted into the sipe blades 26, and more specifically, into the connecting paths 37 (the extending portions 38) and the distal end paths 47 that have been molded, and the flowing-in of molten metal into the connecting paths 37 and the distal end paths 47 is impeded by these molding pins 52. Here, for example, piano wires or stainless steel wires whose outer peripheries are covered by ceramic, plastic or the like can be used as the aforementioned molding pins 52. Next, a cavity 54, which is in a sealed state and has a complementary relationship with the mold main body 17 (the sector molds 15), is formed by the above-described casting mold 50 and an outer mold 53, and, thereafter, molten metal that is an aluminum alloy or the like is injected into this cavity 54.

Then, when the above-described molten metal has cooled and solidified, the molten metal structures the mold main body 17 (the sector molds 15). At this time, the embedded portions 27 of the sipe blades 26 are fixed in the mold main body 17 (the sector molds 15) in insert-cast and embedded states, and, on the other hand, the molding pins 52 that project-out from the sipe blades 26 also are insert-cast. Next, after the casting mold 50 is collapsed and the sipe blades 26 are exposed, the molding pins 52 are pulled-out from the sipe blades 26 and the mold main body 17 (the sector molds 15) toward the distal end sides (the radial direction inner sides) of the sipe blades 26. Due thereto, the extending portions 38 of the connecting paths 37 and the distal end paths 47 that are positioned on the same straight lines are formed within the sipe blades 26, and further, the discharge paths 40, which communicate with the extending portions 38 and are positioned on the same straight lines as the extending portions 38, are formed in the mold main body 17 (the sector molds 15). By doing so, the discharge paths 40 that communicate with the extending portions 38 of the connecting paths 37 can be formed easily. Note that, in a case in which the distal end paths 47 are not formed within the sipe blades 26, it suffices to, after carrying out work that is similar to that described above, pull the molding pins out from the mold main body 17 (the sector molds 15) and the sipe blades 26 toward the other end opening 42 sides (the radial direction outer sides) of the discharge paths 40. Further, the discharge paths 40 may be formed by using electrical discharge machining, a hole-forming drill, or the like after the molten metal has solidified and the mold main body 17 has been molded.

Operation of above-described Embodiment 1 is described next. When the unvulcanized tire T is to be vulcanized by using the tire vulcanizing device 11 described above, the unvulcanized tire T is transported into the vulcanization mold 25 that is in an open state, and is fit-together with the outer side of the vulcanization bladder 23 that is formed in a cylindrical shape, and is placed laterally on the lower mold 12. Next, while the upper clamp ring 22 is lowered, the vulcanization medium is supplied into the vulcanization bladder 23, and the vulcanization bladder 23 is inflated into the shape of a donut and made to enter into the interior of the unvulcanized tire T. At this time, the upper mold 13 is lowered and made to approach the lower mold 12, and the plural sector molds 15 are moved synchronously toward the radial direction inner side. Due thereto, the lower mold 12, the upper mold 13 and the sector molds 15 are fit tightly to one another, and the vulcanization mold 25 is closed, and the unvulcanized tire T is accommodated within the vulcanization mold 25. Thereafter, when the high-pressure, high-temperature vulcanization medium is supplied into the vulcanization bladder 23, and the lower mold 12, the upper mold 13 and the sector molds 15 are heated, the unvulcanized tire T is vulcanized while being pushed against and patterned by the lower mold 12, the upper mold 13 and the sector molds 15.

At the time of such vulcanization, when air remains between the unvulcanized tire T and the vulcanization mold 25, there is the concern that air entry or recesses will arise at the vulcanized tire. However, as described above, the introducing paths 33, 34 and the connecting paths 37 are formed in the sipe blades 26, and the discharge paths 40 and the vent holes 44 are formed in the lower mold 12, the upper mold 13 and the sector molds 15, and the aforementioned air is discharged to the exterior of the vulcanization mold 25. Therefore, the occurrence of such air entry and recesses is suppressed effectively. If paths that are structured from the introducing paths 33, 34 and the connecting paths 37, which are formed in the sipe blades 26, and the discharge paths 40, which are formed in the mold main body 17, are provided as air discharge paths other than the vent holes 44 in this way, the number of vent holes 44 that are formed in the vulcanization mold 25 can be reduced, and the number of spews that arise at the surface of the vulcanized tire can be reduced. Note that, at the time of vulcanization such as described above, the discharge paths 40 and the vent holes 44 may be connected to a vacuum source, and the air that has remained between the unvulcanized tire T and the vulcanization mold 25 may be forcibly discharged. Further, at the time of vulcanization such as described above, there is the concern that unvulcanized rubber will penetrate-in into the distal end portions of the distal end paths 47. However, even if unvulcanized rubber does penetrate-in into the distal end paths 47, it is not problematic because this rubber is easily pulled-out from the distal end paths 47 at the time the mold is opened. Moreover, as described above, the maximum flow path sectional areas of the connecting paths 37, which connect the introducing paths 33, 34 formed in the sipe blades 26 and the proximal end openings 39 of the sipe blades 26, are made to be less than or equal to the opening surface areas at the one end openings 41 of the discharge paths 40 that communicate with these proximal end openings 39. Therefore, the flow path sectional area at every position of the connecting paths 37 also is less than or equal to the opening surface area of the one end openings 41 at the discharge paths 40, and, due thereto, the volume of the connecting paths 37 (cavities) within the sipe blades 26 can be made to be a small value.

As a result, the thermally conductive states with respect to unvulcanized rubber at the both sides of the sipe blade 26 at the time of vulcanization approximate one another, and the rates of progression of vulcanization at the both sides of the sipe blade 26 can be effectively be made to be uniform. Next, when vulcanization ends, the upper mold 13 is moved upward, and, on the other hand, the sector molds 15 are moved synchronously toward the radial direction outer sides, and, due thereto, the vulcanization mold 25 is opened. At this time, the projecting portions 28 of the sipe blades 26 that are provided at the peripheral direction both end portions of each of the sector molds 15 extend at inclines with respect to the moving directions of the sector molds 15 (the radial directions), and therefore, bending force is applied from the unvulcanized tire to the projecting portions 28 of the sipe blades 26. However, in this embodiment, as described above, the volume of the connecting paths 37 (cavities) that are formed within the sipe blades 26 is a small value, and therefore, the sipe blades 26 have high strength overall. As a result, even in the case of a free state in which the transverse direction both end portions of the sipe blade 26 are not embedded in the mold main body 17 (the rib 16), the bending strain at the border of the embedded portion 27 and the projecting portion 28 at the time when bending force is applied to the sipe blade 26 due to opening of the vulcanization mold 25 can be kept to a small value. Accordingly, a situation such as the sipe blade 26 breaking at that region is suppressed effectively.

Figure 6:
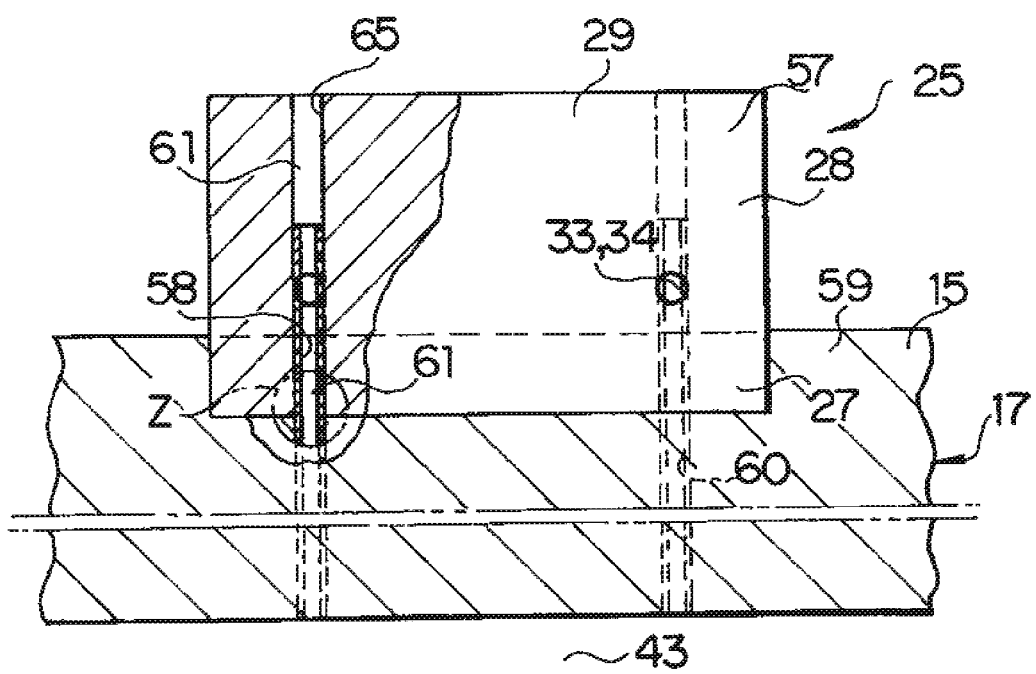
FIG. 6 is a front sectional that is similar to FIG. 2 and shows Embodiment 2 of this invention.
Figure 7:
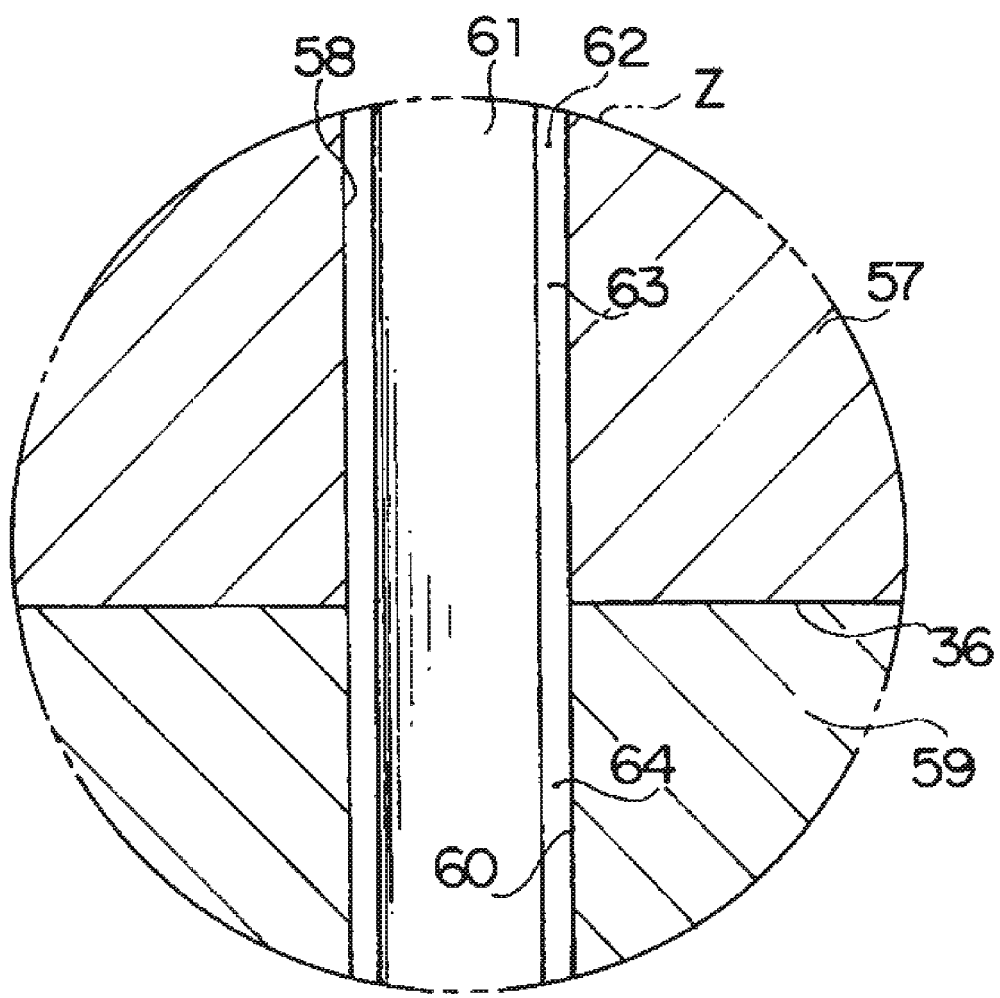
FIG. 7 is an enlarged sectional view of portion Z of FIG. 6.

FIGS. 6 and 7 are drawings showing Embodiment 2 of this invention. In this embodiment, an extending hole 58 that extends along the side surface of a sipe blade 57 is formed within the sipe blade 57, and a discharge hole 60 that extends on an extension line of this extending hole 58 is formed within a mold main body 59. On the other hand, due to cleaning pins 61 being removably fit loosely in both of the extending hole 58 and the discharge hole 60, an extending portion 63 of a connecting path 62 is formed between the cleaning pin 61 and the extending hole 58, and a discharge path 64 is formed between the cleaning pin 61 and the discharge hole 60. By doing so, when clogging arises at the extending portion 63 of the connecting path 62 or at the discharge path 64 due to use of the vulcanization mold 25 over a long period of time, by removing the cleaning pin 61 from the extending hole 58 and the discharge hole 60, a path for air removal can be ensured quickly, and further, the cleaning work that removes such a clog also is facilitated. Further, in this embodiment, a distal end hole 65, which extends from the distal end of the extending hole 58 to the distal end surface of the sipe blade 57 on an extension line of the extending hole 58, is formed within the sipe blade 57, and the cleaning pin 61 can be removed due to the distal end portion of the cleaning pin 61 that is the same diameter as the distal end hole 65 being fit into this distal end hole 65. By doing so, the cleaning pin 61 can be easily removed from the distal end side of the sipe blade 57, and the eliminating of the aforementioned clog also can be carried out easily from the distal end side of the sipe blade 57. Note that, in this embodiment, the extending hole 58, the discharge hole 60, the distal end hole 65 and the cleaning pin 61 extend rectilinearly, but may be curved slightly. Further, in this embodiment, the above-described distal end hole 65 may be omitted, and, in this case, it suffices to remove the cleaning pin from the radial direction outer end side (the external space 43 side) of the mold main body 59.

Figure 8:
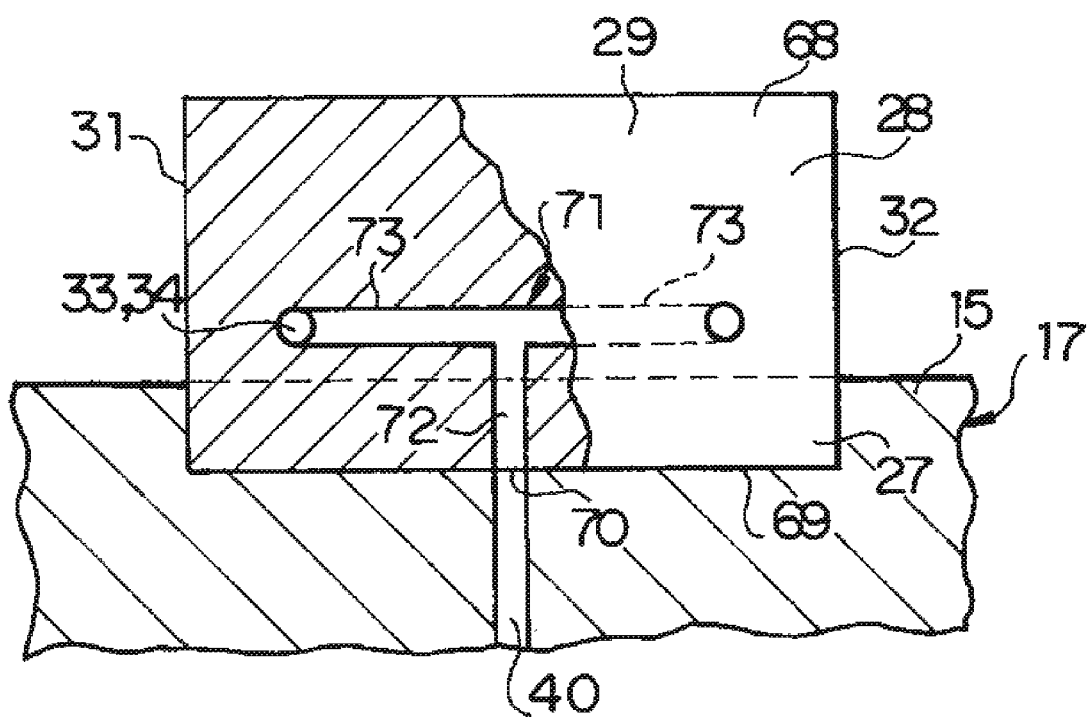
FIG. 8 is a front sectional that is similar to FIG. 2 and shows Embodiment 3 of this invention.

FIG. 8 is a drawing showing Embodiment 3 of this invention. In this embodiment, a connecting path 71 connects the introducing paths 33, 34, which are formed so as to be apart in the transverse direction from the first side surface 29 and the second side surface 30 of a sipe blade 68, and one proximal end opening 70 that opens at a proximal end 69 of the sipe blade 68. The connecting path 71 is configured with one extending portion 72 and two connecting portions 73. An extending portion 72 is connected to the proximal end opening 70 and extends rectilinearly in a direction normal to the inner surface of the mold main body 17. Transverse direction outer ends of a connecting portion 73 communicate with the introducing paths 33, 34, and, on the other hand, transverse direction inner ends of the connecting portion 73 communicate with the distal end of the extending portion 72 while orthogonally intersecting the extending portion 72. Due thereto, the connecting portion 73 is connected to the introducing paths 33, 34 and the extending portion 72. As a result, in this embodiment, the connecting path 71 is bent in a T-shape. Here, in this embodiment as well, a total of four of the introducing paths 33, 34 exist, and therefore, four of the connecting paths 71 exist. However, because the connecting portions 73 of the connecting paths 71 are used in common at the introducing paths 33, 34 that are formed as pairs, the actual number of connecting portions 73 is two. Further, because the extending portions 72 of the connecting paths 71 are used in common at the connecting portions 73 that are at the both sides, the actual number of extending portions 72 is one. As a result, air, which flows-into the introducing paths 33, 34, flows through the two connecting portions 73 toward the transverse direction inner side while merging together, and, thereafter, flows through the one extending portion 72 toward the discharge path 40 while merging with one another further in the extending portion 72. Note that, in this embodiment, a distal end path, which extends from the extending portion 72 to the distal end surface of the sipe blade 68, is not formed.

Figure 9:
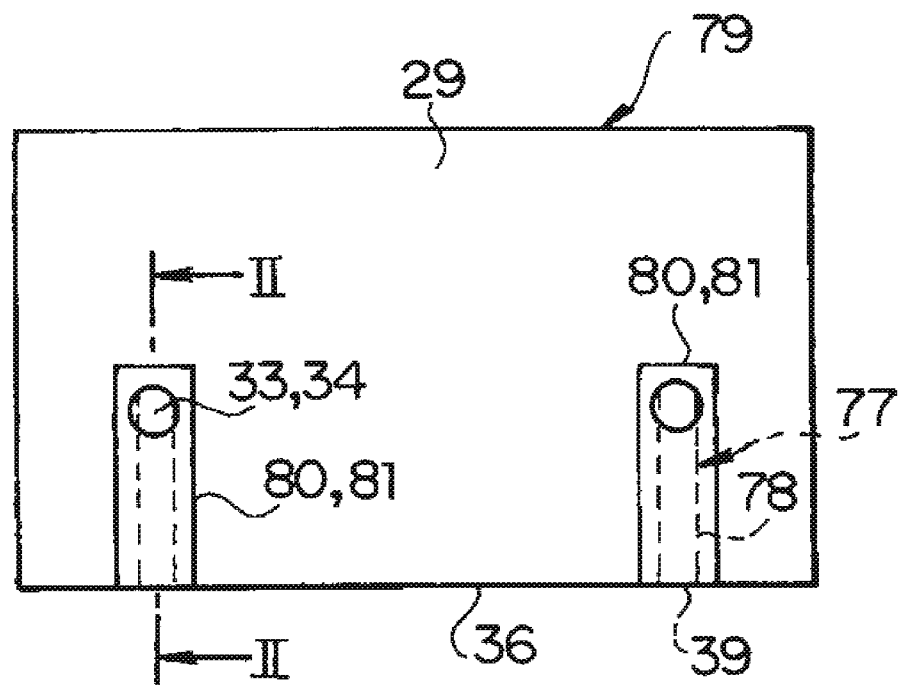
FIG. 9 is a front view of a blade and shows Embodiment 4 of this invention.
Figure 10:
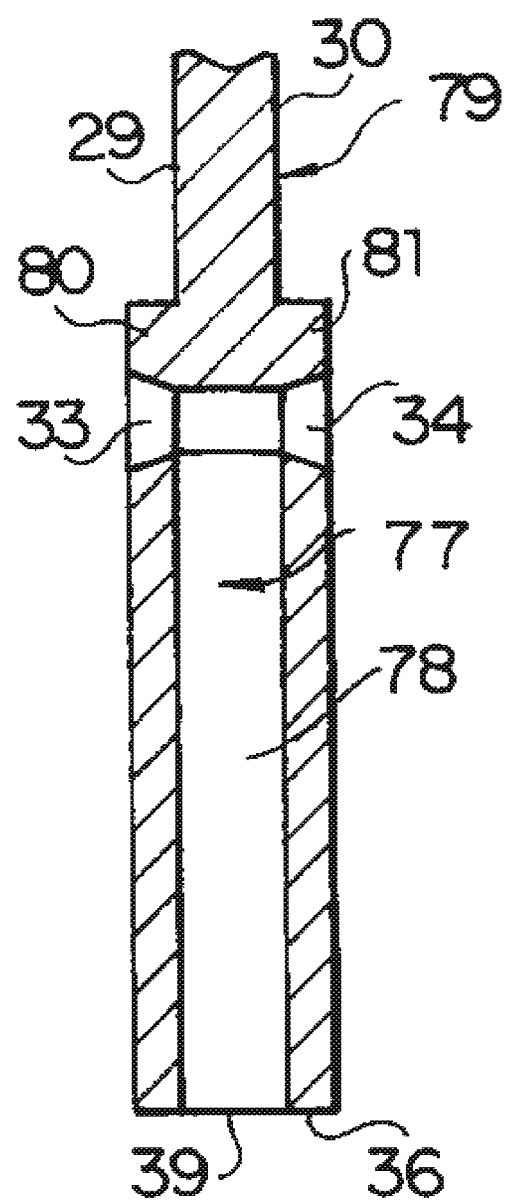
FIG. 10 is a cross-sectional view seen in the direction of arrow line II-II of FIG. 9.

FIGS. 9 and 10 are drawings showing Embodiment 4 of this invention. In this embodiment, projections 80, 81 that extend along an extending portion 78 are formed in the first side surface 29, the second side surface 30 of a sipe blade 79 at regions that overlap a connecting path 77 (the extending portion 78). Due thereto, the sipe blade 79 at the regions overlapping the extending portion 78 is thick-walled. Namely, the thickness of the sipe blade 79 is increased. As a result, even if the sipe blade 79 is made to be thin on the whole, the connecting path 77, which has the extending portion 78 whose flow path sectional area is large, can be formed within the sipe blade 79 without problems. Note that, in this embodiment, a connecting portion such as described above that connects the introducing paths 33, 34 and the extending portion 78, and a distal end path as described above that extends from the extending portion 78 to the distal end surface of the sipe blade 79, are not formed.

INDUSTRIAL APPLICABILITY

The present disclosure can be applied to the industrial field of tire vulcanization molds that have a mold main body, and sipe blades whose proximal end sides are fixed to the mold main body in embedded states.

The disclosure of Japanese Patent Application No. 2015-226771 that was filed on Nov. 19, 2015 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A tire vulcanization mold comprising a mold main body, and blades having, at proximal end sides thereof, embedded portions that are fixed to the mold main body in embedded states, and, at distal end sides thereof, projecting portions that project out from an inner surface of the mold main body, wherein
   at least one introducing path that extends from a projecting portion side surface toward a blade inner portion is formed at each blade,
   a connecting path, which is shaped as a closed space and which connects the introducing path and a proximal end opening that opens at a proximal end of the blade, is formed at an interior of each blade,
   a discharge path, whose one end opening communicates with the proximal end opening and whose other end opening communicates with an external space, is formed in the mold main body, and
   a maximum flow path sectional area at the connecting path is less than or equal to an opening surface area of the one end opening of the discharge path.

2. The tire vulcanization mold of claim 1, wherein:
   the connecting path is structured at least from an extending portion that extends along a side surface of each blade, and a distal end path, which extends from a distal end of the extending portion to a distal end surface of each blade on an extension line of the extending portion, is formed within each blade.

3. The tire vulcanization mold of claim 2, wherein a molding pin, which is inserted in the extending portion of each blade and is insert-cast in the mold main body, forms a discharge path that communicates with the extending portion of the connecting path, due to the molding pin being pulled out from the blade and the mold main body.

4. The tire vulcanization mold of claim 1, wherein:
an extending hole, which extends along a side surface of each blade, is formed within each blade,
a discharge hole, which extends on an extension line of the extending hole, is formed within the mold main body,
due to a cleaning pin being removably fit loosely in both the extending hole and the discharge hole, an extending portion of the connecting path is formed between the cleaning pin and the extending hole, and
the discharge path is formed between the cleaning pin and the discharge hole.

5. The tire vulcanization mold of claim 2, wherein each blade, at a region that overlaps the extending portion, is made to be thick-walled.

6. The tire vulcanization mold of claim 1, wherein the introducing paths, which are formed as a pair and are formed in both side surfaces of the projecting portion, are positioned on a same straight line, and the introducing paths that are formed as a pair communicate with one another.

7. The tire vulcanization mold of claim 1, wherein:
the connecting path is structured at least from an extending portion that extends along a side surface of each blade,
a distal end path, which extends from a distal end of the extending portion to a distal end surface of each blade on an extension line of the extending portion, is formed within each blade,
a molding pin, which is inserted in the extending portion of each blade and is insert-cast in the mold main body, forms a discharge path that communicates with the extending portion of the connecting path, due to the molding pin being pulled out from the blade and the mold main body, and
each blade, at a region that overlaps the extending portion, is made to be thick-walled.

8. The tire vulcanization mold of claim 1, wherein:
an extending hole, which extends along a side surface of each blade, is formed within each blade,
a discharge hole, which extends on an extension line of the extending hole, is formed within the mold main body,
due to a cleaning pin being removably fit loosely in both the extending hole and the discharge hole, an extending portion of the connecting path is formed between the cleaning pin and the extending hole,
the discharge path is formed between the cleaning pin and the discharge hole, and
each blade, at a region that overlaps the extending portion, is made to be thick-walled.

9. The tire vulcanization mold of claim 1, wherein:
the connecting path is structured at least from an extending portion that extends along a side surface of each blade,
a distal end path, which extends from a distal end of the extending portion to a distal end surface of each blade on an extension line of the extending portion, is formed within each blade, and
the introducing paths, which are formed as a pair and are formed in both side surfaces of the projecting portion, are positioned on a same straight line, and the introducing paths that are formed as a pair communicate with one another.

10. The tire vulcanization mold of claim 1, wherein:
the connecting path is structured at least from an extending portion that extends along a side surface of each blade,
a distal end path, which extends from a distal end of the extending portion to a distal end surface of each blade on an extension line of the extending portion, is formed within each blade,
a molding pin, which is inserted in the extending portion of each blade and is insert-cast in the mold main body, forms a discharge path that communicates with the extending portion of the connecting path, due to the molding pin being pulled out from the blade and the mold main body, and
the introducing paths, which are formed as a pair and are formed in both side surfaces of the projecting portion, are positioned on a same straight line, and the introducing paths that are formed as a pair communicate with one another.

11. The tire vulcanization mold of claim 1, wherein:
an extending hole, which extends along a side surface of each blade, is formed within each blade,
a discharge hole, which extends on an extension line of the extending hole, is formed within the mold main body,
due to a cleaning pin being removably fit loosely in both the extending hole and the discharge hole, an extending portion of the connecting path is formed between the cleaning pin and the extending hole,
the discharge path is formed between the cleaning pin and the discharge hole, and
the introducing paths, which are formed as a pair and are formed in both side surfaces of the projecting portion, are positioned on a same straight line, and the introducing paths that are formed as a pair communicate with one another.

12. A method of manufacturing a tire vulcanization mold that has a mold main body, and blades having, at proximal end sides thereof, embedded portions that are fixed to the mold main body in embedded states, and, at distal end sides thereof, projecting portions that project out from an inner surface of the mold main body, the method comprising:
a step of forming, in each blade and in advance, at least one introducing path that extends from a projecting portion side surface toward a blade inner portion, and forming a connecting path, which is shaped as a closed space and which connects the introducing path and a proximal end opening that opens at a proximal end of the blade, at an interior of each blade, and
a step of, by fixing the embedded portion of the blade to the mold main body, causing one end opening of a discharge path, which is formed in the mold main body and whose other end opening communicates with an external space, to communicate with the proximal end opening, wherein a maximum flow path sectional area at the connecting path is less than or equal to an opening surface area of the one end opening of the discharge path.

13. The method of manufacturing a tire vulcanization mold of claim 12, wherein: at a time of forming the connecting path, the connecting path is structured at least from an extending portion that extends along a side surface of each blade, and
- a distal end path, which extends from a distal end of the extending portion to a distal end surface of each blade on an extension line of the extending portion, is formed within each blade.

14. The method of manufacturing a tire vulcanization mold of claim 13, further comprising a step of pulling out, from each blade and the mold main body, a molding pin that is inserted in the extending portion of each blade and is insert-cast in the mold main body, wherein a discharge path that communicates with the extending portion of the connecting path is formed by the step of pulling out.

15. The method of manufacturing a tire vulcanization mold of claim 12, wherein:
- an extending hole, which extends along a side surface of each blade, is formed within each blade,
- a discharge hole, which extends on an extension line of the extending hole, is formed within the mold main body,
- due to a cleaning pin being removably fit loosely in both the extending hole and the discharge hole, an extending portion of the connecting path is formed between the cleaning pin and extending hole, and
- the discharge path is formed between the cleaning pin and the discharge hole.

16. The method of manufacturing a tire vulcanization mold of claim 13, wherein each blade, at a region that overlaps the extending portion, is made to be thick-walled.

17. The method of manufacturing a tire vulcanization mold of claim 12, wherein the introducing paths, which are formed as a pair and are formed in both side surfaces of the projecting portion, are positioned on a same straight line, and the introducing paths that are formed as a pair communicate with one another.

18. A method of manufacturing a tire vulcanization mold of claim 12, wherein:
- an extending hole, which extends along a side surface of each blade, is formed within each blade,
- a discharge hole, which extends on an extension line of the extending hole, is formed within the mold main body,
- due to a cleaning pin being removably fit loosely in both the extending hole and the discharge hole, an extending portion of the connecting path is formed between the cleaning pin and extending hole,
- the discharge path is formed between the cleaning pin and the discharge hole, and
- each blade, at a region that overlaps the extending portion, is made to be thick-walled.

19. A method of manufacturing a tire vulcanization mold of claim 12, wherein:
- at a time of forming the connecting path, the connecting path is structured at least from an extending portion that extends along a side surface of each blade,
- a distal end path, which extends from a distal end of the extending portion to a distal end surface of each blade on an extension line of the extending portion, is formed within each blade, and
- the introducing paths, which are formed as a pair and are formed in both side surfaces of the projecting portion, are positioned on a same straight line, and the introducing paths that are formed as a pair communicate with one another.

20. A method of manufacturing a tire vulcanization mold of claim 12, wherein:
- an extending hole, which extends along a side surface of each blade, is formed within each blade,
- a discharge hole, which extends on an extension line of the extending hole, is formed within the mold main body,
- due to a cleaning pin being removably fit loosely in both the extending hole and the discharge hole, an extending portion of the connecting path is formed between the cleaning pin and extending hole,
- the discharge path is formed between the cleaning pin and the discharge hole, and
- the introducing paths, which are formed as a pair and are formed in both side surfaces of the projecting portion, are positioned on a same straight line, and the introducing paths that are formed as a pair communicate with one another.

* * * * *